United States Patent [19]

Seats

[11] Patent Number: 4,827,183

[45] Date of Patent: May 2, 1989

[54] CRT WITH MEANS FOR MONITORING ELECTRON BEAM

[75] Inventor: Peter Seats, Boonton, N.J.

[73] Assignee: Thomson Electron Tubes & Devices Corporation, Dover, N.J.

[21] Appl. No.: 151,439

[22] Filed: Feb. 2, 1988

[51] Int. Cl.⁴ .................... H01J 29/88; H01J 29/89
[52] U.S. Cl. ..................... 313/431; 313/475; 313/478; 313/479; 358/901
[58] Field of Search ............ 313/477 R, 495, 419, 313/372, 475, 431, 432, 479, 478, 471; 358/901

[56] References Cited

U.S. PATENT DOCUMENTS

| | | | |
|---|---|---|---|
| 2,244,748 | 6/1941 | Walker | 313/432 |
| 2,657,257 | 10/1953 | Lesti | 313/433 |
| 2,880,341 | 3/1959 | Aiken et al. | 313/422 |
| 2,975,230 | 3/1961 | Schlesinger | 313/471 X |
| 3,609,233 | 9/1971 | Nagao | 313/372 X |
| 3,668,387 | 6/1972 | Johnson | 313/475 |
| 3,715,617 | 2/1973 | Tilton et al. | 313/475 X |

FOREIGN PATENT DOCUMENTS 792021 3/1958 United Kingdom ............ 313/495

Primary Examiner—Palmer C. DeMeo
Attorney, Agent, or Firm—Roland Plottel

[57] ABSTRACT

A cathode ray tube useful as a transducer for converting electrical signal information into a visual pattern on a recording medium uses a cylindrical envelope along which a signal modulated beam is projected. A fiber optics plate is positioned along the sidewall of the envelope and the beam is swept in a liner scan of the fiber optics plate by an array of electromagnets, positioned along the envelope and properly excited to deflect the beam appropriately. For monitoring the properties of the electron beam, the inner surface of the end plate of the envelope is provided with a patterned coating of luminescent material on which the electron beam is incident when undeflected by the array of electromagnets. Sensors are provided for measuring the flux distribution for monitoring the properties of the electron beam.

5 Claims, 1 Drawing Sheet

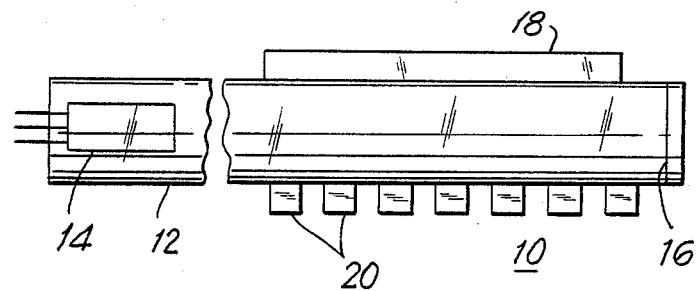
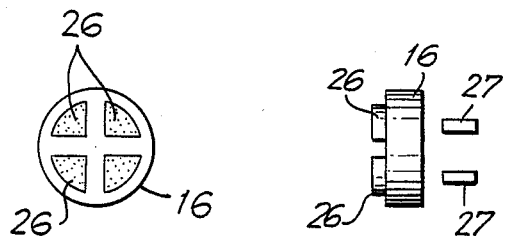

CRT WITH MEANS FOR MONITORING ELECTRON BEAM

FIELD OF THE INVENTION

This invention relates to a cathode ray tube (CRT) and more particularly to a CRT that is especially configured for scanning essentially along a linear region much narrower than the scan length to be described as a line scan.

RELATED APPLICATION

This invention relates to a modification of the CRT described in my application Ser. No. 151,437, filed at the same time as this application and having a common assignee.

BACKGROUND OF THE INVENTION

In my above-identified application, there is described a CRT that uses a long essentially cylindrical envelope in which an electron beam is launched to travel longitudinally parallel to the longitudinal axis of the envelope. Extending longitudinally along a sidewall of the envelope is included a fiber optics faceplate whose inner surface is coated with a phosphor and whose outer surface is adopted to contact a photosensitive recording medium. An array of electromagnets is included along the envelope and, when appropriately energized, serves to deflect transversely the electron beam at varying points along its path such that the electron beam sweeps along the faceplate in a line scan.

In such a tube, it is particularly important to calibrate and adjust the electron beam current and beam position. Moreover, it is difficult to monitor the electron beam on the sidewall fiber optics faceplate to effect such calibration and adjustment.

SUMMARY OF THE INVENTION

To permit such calibration and adjustment, a cylindrical CRT of the kind described is provided with a coating, at the downstream end of the envelope, aligned with the electron gun to intercept the electron beam, in the absence of any magnetic deflection, to make it incident on the envelope endwall. Moreover, this coating is patterned appropriately to divide it into discrete segments, each of which is separately monitored, so that comparison of amounts intercepted by the different segments can be used to determine the position of the beam as it is intercepted by the coating. Thereafter the monitoring signals are used to reposition the beam as desired. Moreover, the direct measurement of the total output from the coating can be used to monitor and control the total current in the electron beam.

The coating in the preferred embodiment is luminescent so that incident electrons excite the emission of light which can be detected by appropriate sensors. Alternatively, the coating may be non-luminescent and the incident electrons measured directly.

The invention will be better understood from the following more detailed description taken in conjunction with the accompanying drawing.

BRIEF DESCRIPTION OF THE DRAWING

FIG. 1 shows a side view of a simple form of CRT of the kind described in my copending application, modified in accordance with the invention, and FIG. 2 shows the end surface of envelope of the CRT of FIG. 1 provided with a patterned luminescent coating in accordance with the invention.

FIG. 3 shows a side view of the end surface shown in FIG. 2 along with sensors for detecting the luminescence from individual segments of the patterned luminescent coating.

DESCRIPTION OF THE INVENTION

FIG. 1 shows a CRT 10 that comprises a substantially circular cylindrical envelope 12, typically of glass, whose axial length is considerably longer than its diameter. At one end of the envelope is positioned an electron gun 14 designed to launch an electron beam longitudinally along the axis of the envelope. At the downstream end of the envelope, the end plate 16 has its inner surface coated with a luminescent coating or phosphor that emits light when impinged by electrons. The coated end surface 16 is shown in plan view in FIG. 2 and will be described more fully hereinafter.

As described in my copending application, the envelope is provided along a sidewall with a fiber optics plate 18 that extends longitudinally parallel to the axis of the envelope and whose inner surface is coated with a phosphor and whose outer surface in operation is contacted with a recording medium. Additionally, an array of electromagnets 20 shown schematically is positioned along the envelope such that it can be used to deflect periodically the beam in a linear scan of the fiber optics plate 18.

In operation, the intensity of electron beam is modulated by signal information applied to a control element in the electron gun and the electron beam is deflected periodically by energizing successively the electromagnets of the array for scanning periodically the fiber optics plate and exciting correspondingly the phosphor coating. The light excited in the coating is transmitted by way of the fiber optics plate to the recording medium which is moved appropriately past the fiber optics plate.

However, in the absence of exciting currents supplied to the electromagnets, the electron beam will flow past the array undeflected and impinge on the end plate 16 of the envelope. In usual fashion, the inner surface of the sidewalls of the envelope are coated with a conductive coating maintained at a suitable voltage to insure the desired flow. The end plate 16 is maintained at a suitable potential to attract the electron beam.

In FIG. 2, there is shown the inner surface of the end plate 16, and it is provided with a coating 26 of a luminescent material suitable for excitation by the incident electrons. As seen, the coating 26 is patterned into segments so that the flux distribution of the excited light may be more readily monitored. To this end, as seen in FIG. 3 a separate light sensor 27 for each segment is positioned behind the plate 16 so that the light from each segment of the coating 26 may be monitored for comparison. Typically the coating is divided into at least three segments, four are shown here. A variety of patterns may be used, depending on the mode of control being effected. In the monitoring mode, it may be desirable to defocus the beam to ease the position discrimination and measurement of total current.

Alternatively, by incorporating a grid structure in the coating pattern and perturbing the beam with a minor positioning signal, spot resolution and degree of focus can be measured.

Similarly, by applying positioning signals and measuring spot displacement, positioning currents can be also measured and calibrated.

Moreover, in some instances it may be unnecessary to pattern the coating, particularly if only beam current intensity is being monitored.

It can be appreciated that considerable flexibility is provided by integrating the current of the undeflected beam at the end of the tube envelope and measuring it.

It should also be appreciated that the number and distribution of electrons incident on the end plate of the tube can be measured directly rather than indirectly. In this case, the coating 26 at the end plate need not be luminescent for emitting light in response to the incident electrons but rather may be of the type used in storage tubes to permit measurement of the incident electrons either capacitively or directly. In the latter case, there would be need for a conductive connection to each coating segment through the glass end plate.

Moreover, as described in the above-identified copending application, various modifications may be made in the tube envelope to facilitate the transverse deflection of the beam for scanning the sidewall faceplate.

Alternatively, electrostatic deflection of the electron beam can be used instead of magnetic deflection.

What is claimed is:

1. A cathode ray tube comprising
   an elongated envelope,
   an electron gun at one end of the envelope for forming and launching an electron beam for flow longitudinally along the envelope to its opposite end,
   a fiber-optics plate extending longitudinally along a sidewall of the envelope for scanning by the electron beam,
   means disposed along the envelope for deflecting, when energized the electron beam from longitudinal flow to transverse flow for incidence along the fiber-optics plate,
   a coating on the opposite end of the tube envelope aligned in target relationship with the electron gun so that the electron beam is incident thereon in the absence of said deflecting means being energized,
   and means for monitoring the electrons in said coating when the electron beam is incident thereon.

2. The cathode ray tube of claim 1 in which the coating is patterned into segments and the means for monitoring measure the distribution of the electrons incident on the segments of the coating.

3. The cathode ray tube of claim 1 in which the coating is luminescent and patterned into at least three segments and a separate light sensor is positioned behind each segment for monitoring the electrons incident on the coating.

4. The cathode ray tube of claim 3 in which the electron beam is defocused when undeflected to increase its cross-section when incident on the luminescent coating.

5. The cathode ray tube of either claim 1, 2, 3 or 4 in which the means for deflecting are magnetic.

* * * * *